Aug. 19, 1941.  L. A. FISCHER  2,253,371
VALVE
Filed Feb. 21, 1939
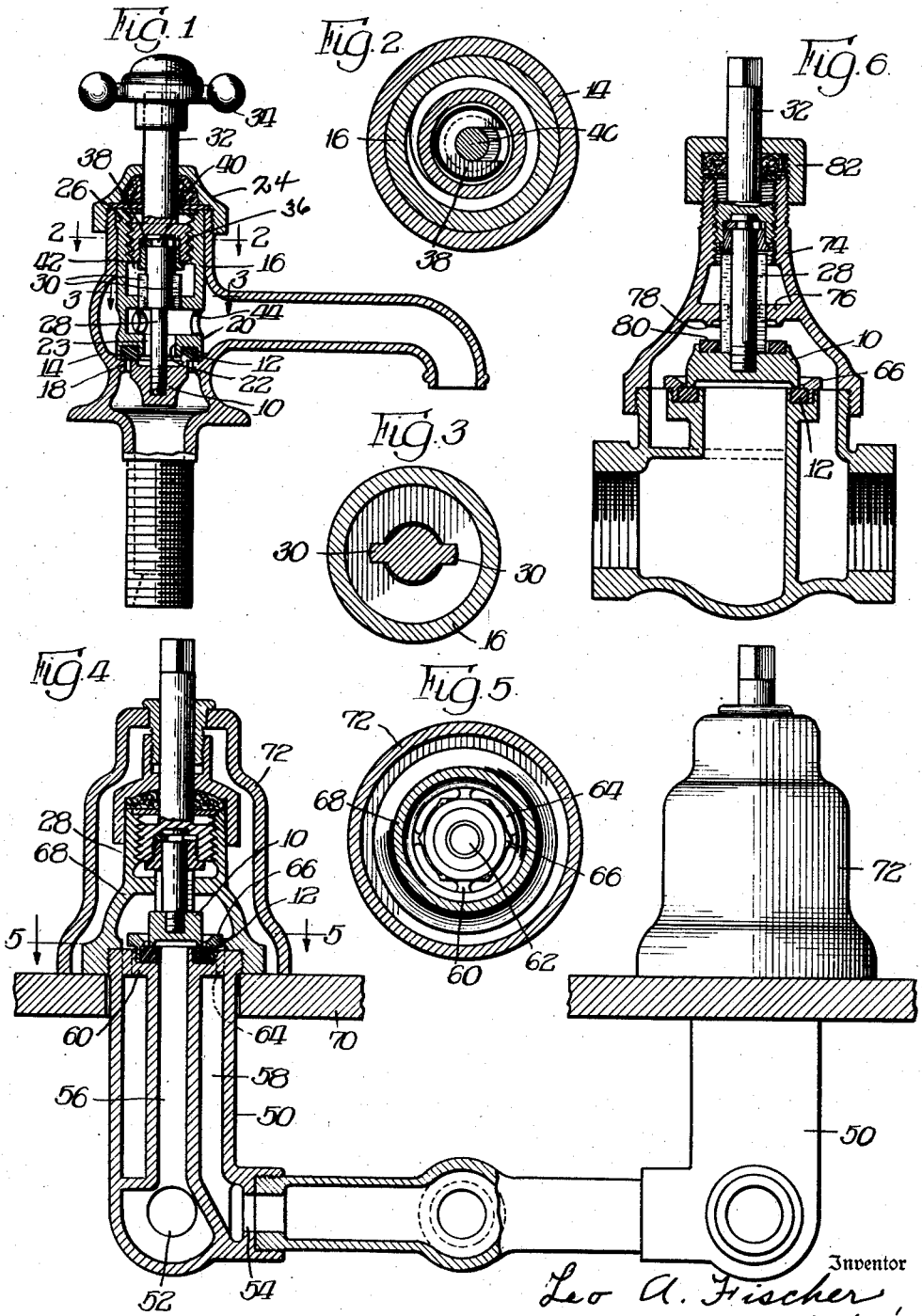
Inventor
Leo A. Fischer
Attorneys Patented Aug. 19, 1941

2,253,371

UNITED STATES PATENT OFFICE 2,253,371

VALVE

Leo A. Fischer, Osborn, Ohio

Application February 21, 1939, Serial No. 257,691

2 Claims. (Cl. 251—46)

This invention relates to valves suitable for numerous uses, as pipe valves or faucet valves. In all of its illustrated forms, the invention comprises an annular washer seat around the inlet port and through which the fluid may flow, and a valve disk movable without rotation into engagement with said washer to cut off the flow of fluid therethrough. This, however, is not an essential feature as to some aspects of the invention. Another feature is a readily removable washer and a readily removable valve piece. To this end the washer is either mounted on the removable sleeve or else mounted on an extension which brings it to a position of ready accessability.

Numerous objects are accomplished by this invention. A valve construction is provided on which the wear on the washer is so negligible that one washer will last for years. At the same time the construction is such that the valve is very easily opened and closed and the valve parts very easily put together in watertight relationship. It is also possible to replace with ease either the washer or the valve piece. Although prior constructions have had this object in view, none of them have satisfactorily attained it, for although the parts may have been readily replaceable when new, they were so located and of necessity so tightened that they could not be loosened after corrosion without great difficulty, often involving tearing out the plumbing.

With these and various other objects in view, the invention may consist of certain novel features of construction and operation, as will be more fully described and particularly pointed out in the specification, drawing and claims appended hereto.

In the drawing, which illustrates three embodiments of the device, and wherein like reference characters are used to designate like parts, Figure 1 is a sectional view illustrating one form of valve constructed in accordance with this invention, as used in a faucet;

Figure 2 is a section through the line 2—2 of Figure 1;

Figure 3 is a section through the line 3—3 of Figure 1;

Figure 4 is a view partly in section illustrating another form of this invention as applied to built-in fixtures such as shower valves;

Figure 5 is a sectional view taken along the line 5—5 of Figure 4; and

Figure 6 is a sectional view of a pipe valve, especially suitable for use as a steam valve.

Although this invention may take many forms, only a few of them have been chosen for the purpose of illustration. All of the forms show a movable valve disk 10 and seat washer 12 which is annular in form and through which the fluid flows except when cut off by the seating of the valve disk 10 on the seat washer 12. In the form shown in Figure 1, both of these parts are removable from the faucet or valve housing 14 with the sleeve 16, being parts of a removable valve head. The valve housing is provided with a seat portion 18 against which the washer 12 permanently seats when the sleeve is in place. This seat 18 may be provided with a raised ring if desired. An external flange 20 and an internal flange 22 may be provided on the sleeve to form a pocket for the seat washer 12 and to prevent it from spreading. The washer need not fit tightly in this pocket, however, as it will be sufficiently held in place by the valve disk 10 during insertion, and by the housing seat 18 during use.

The sleeve 16 is pressed into place by the cap 24 which screws onto the housing, suitable packing being provided to prevent leakage. The sleeve may be keyed as at 26 to prevent its rotation either during insertion or during the operation of the valve. This feature positively prevents wear of the housing seat 18 or the outer portion of the seat washer 12. The presence of the seat washer 12 further prevents injury to the seat 18 since any hard foreign substance which during manufacture is left on the seat is merely pressed into the washer without injury to the seat and usually without causing any leak. Former commercial valves of this type have been deficient in that the sleeve depended on the ground joint which had to be absolutely clean to prevent both leakage and injury, or because in operating the valve a workman would occasionally turn the sleeve and score the ground surfaces or any other valve seat, thus causing a leak even if these were none before.

The valve disk 10 is screwed tightly onto a sliding valve stem 28. This stem is provided with a pair of wings 30 which slide in suitable grooves in the sleeve 16 and thus permit vertical movement of the valve stem 28 and disk 10 while positively preventing rotation thereof. The longitudinal or vertical movement of the valve stem may be produced in a variety of ways. One manner may consist in merely providing a spring or relying on the water pressure for closing the valve and permitting the stem to be pressed down by hand. The preferred form, however, is to provide a screw stem 32 having a suitable handle 34 and threads 36 engaging like threads on the sleeve 16. The lower end of the screw stem 32 may be provided with a suitable socket into which the sliding stem 28 may be inserted and pivotally secured. One of the simplest forms of pivotal linking is that illustrated in which a split washer 38 is inserted in an annular groove 30 at the head of sliding stem 28 after an externally threaded sleeve 42 has been slid onto the sliding stem. This sleeve 42 is then screwed into the lower head of the turn stem 32 holding the split washer in the socket in said head and through it holding the sliding stem also in said socket. Because of the construction of this swivel joint, it is loose enough so that if the valve disk 10 is not properly squared off with respect to the washer 12 it will shift itself to the proper position. Having shifted to this position, it would not make any difference if corrosion prevented further shifting, since any rotation of the disk is positively prevented.

From the drawing therefore it will be readily understood that when the handle 34 is turned the turn stem 32 is lowered by the threads 36, thus sliding the slide stem 28 downwardly. This unseats disk 10 from seat washer 12 and permits water to flow through the annular passage 23 from which it flows through openings 44 into the nozzle of the faucet. When the handle is turned in the opposite direction, the valve disk 10 is drawn upwardly without rotation and seats gently but firmly on the seat washer 12 without any appreciable wear on the latter.

Inasmuch as the valve disk 10 does not rotate with respect to the seat washer 12, there is very little chance that the valve disk will become scratched or cut in such manner as to leak. However, if it should, it may be very easily replaced by merely unscrewing cap 24, removing bodily sleeve 16 with its associated parts and merely unscrewing the disk 10 from the stem 28. When the disk is thus removed, the seat washer 12 may also be replaced, since it is not secured in place by any other means.

In the form shown in Figure 4 the valve base 50 is provided with an inlet 52 and outlet 54. The inlet 52 is connected with an extension passage or extended inlet port 56 and the outlet 54 is connected with a parallel extension passage or extended outlet port 58. These passages may be annular or semi-cylindrical, or any other desired shape. The valve base 50 is provided with an extension head or port face 60 which is perforated at the center with the hole 62 communicating with the extension passage 56, and is perforated annularly with the openings 64 which communicate with the outlet extension passage 58. The seat washer 12 is seated in this extension head and may be retained in place by an annular threaded cap 66. The valve disk 10 in Figure 4 seats against the outside of the seat washer 12 and closes against the pressure of water instead of with it. It should be noted, however, that in this form of the invention a replaceable seat can be screwed into the position of washer 12 and the washer secured in the position of disk 10. This, of course, would only utilize some of the aspects of this invention and the advantages of the others would be lost. Specifically it might be mentioned that when the washer is used in the position shown, the cap 66 may be left quite loose, being screwed in only with the fingers, the disk 10 providing the pressure for sealing the washer against the extension head 60. The cap 66 is thus comparatively easily removed in spite of corrosion. If a removable seat were used, however, it would have to be screwed in tightly enough to be watertight and it would, therefore, be difficult to remove after corrosion. The valve disk 10 is mounted on the valve stem 28 which is mounted in the housing 68 in the same manner that the corresponding valve stem 28 of Figure 1 is mounted in the sleeve 16. The housing 68 may be screwed onto the extension of the valve base 50 with an ordinary watertight screw joint or suitable packing may be used if desired.

In this type of valve the inlet 52 and outlet 54 with other connecting pipes would normally be built in, that is, hidden behind a wall 70 of tile or the like. By means of the extension shown, the valve washer seat and valve disk are both located on the outside of the wall, so that when the housing 68 and escutcheon 72 are removed the valve cap 66 is exposed in such manner that if it is tight a wrench may be applied to it. Both the washer 12 and the disk 10 may thus be readily removed and replaced if necessary.

The valve shown in Figure 6 is especially suitable for use as a steam valve. In this the seat washer 12, the disk 10, the cap 66 and the slide stem 28 and the housing 74 will function in the same way as the corresponding parts shown in Figure 4. The division wall 76 of the housing however, is provided with a valve seat 78 and the disk 10 is provided with a washer 80, so arranged that when the valve is opened the washer 80 seats against the ring 78 and prevents the escape of steam through the housing. Thus when the valve is opened the cap 82 may be removed and the packing about the turn stem 32 replaced without interrupting the use of the steam pipes. If desired, the washer 80 may be secured in the division wall 78 by a cap similar to the cap 66, the ring 78 being a shape which will not cause interference. Also the position of the washer 80 and the ring 78 could be reversed so that if the seat ring 78 was worn, it could be replaced. As this is rarely used, however, it is not necessary.

One important feature common to all of these valves is a pivotal connection with the turn stem and the slide stem and the associated features. Pivoted valve disks carrying washers have been used before, but in the course of time have become so corroded that they ceased to pivot. This is prevented here due to the fact that the pivotal joint is located outside of the main stream of water, and due to the fact that the pivotal action is positive, being compelled by the turning of the handle and by preventing the turning of the slide stem. Due to this positive pivoting, if any corrosion forms on the pivot parts, it is immediately scraped off. Thus it is seen that no matter how long the valve is in use there will never be any rotation of the valve disk on the seat washer.

It is to be understood that many other embodiments of the invention, including some in improved form, will be apparent, and in the course of time more will be devised by those skilled in the art. It is not desired that this invention be limited to the details described, for its scope includes all such forms or improvements as come within the spirit of the following claims, construed as broadly as the prior art will permit.

Having thus described my invention, I claim:

1. In a valve, an inlet member having a seat at its outer end, a movable closure member, said closure member adapted to seat on the outer face of said inlet seat, a removable compressible washer on the seat of said inlet member, removable screw moving means for moving said movable member into and out of closing contact, means associated with said movable member for positively preventing rotation thereof, and a swivel connection between said screw moving means and said movable closure member comprising a bushing screwed into said screw moving means and a stem on said movable closure member extending into said bushing, a split washer positioned in a groove in said stem and removable only after said bushing has been removed from said screw moving means, said bushing and split washer forming the sole means for holding said stem in said screw moving means.

2. In a valve, an inlet member having a seat at its discharge end and a movable closure member, said closure member being adapted to seat on the outer face of said inlet member seat, a removable compressible washer on one of said members, the seat of the other member being formed of metal, removable screw moving means for moving said movable closure member into and out of closing position, means associated with said movable closure member for positively preventing rotation thereof, and a swivel connection between said screw moving means and said movable closure member comprising a bushing screwed into said screw moving means, a stem connected with said movable closure member extending into said bushing, and a split washer positioned in a groove in said stem and removable only after said bushing has been removed from said screw moving means, said bushing and split washer forming the sole means of holding said stem in said screw moving means.

LEO A. FISCHER.